United States Patent Office 3,243,384
Patented Mar. 29, 1966

3,243,384
REACTIVATION OF SUPPORTED PLATINUM CATALYSTS
Walter P. Raarup, Jr., Darien, Conn., assignor to Shell Oil Company, New York, N.Y., a corporation of Delaware
No Drawing. Filed Apr. 4, 1962, Ser. No. 184,924
4 Claims. (Cl. 252—415)

This invention relates to platinum catalysts, and more particularly to the treatment of deactivated platinum catalysts to restore the activity and selectivity thereof.

Platinum catalysts are used extensively in catalytic reforming processes which have become widely used commercially in the past ten years or so. The platinum catalyst is comprised of platinum, usually supported on a suitable base such as alumina, and a small amount of halogen such as chlorine and/or fluorine to improve hydrocracking and isomerization activity. The catalyst will generally contain from about 0.1 to 2.0% by weight platinum and from about 0.1 to about 3% w. halogen.

The catalytic reforming operation is generally carried out at a pressure in the range from 50 to 1000 p.s.i.g., usually 200 to 700 p.s.i.g., and a temperature in the range of 750° to 1050° F., usually 850° to 1000° F., and a liquid hourly space velocity of 0.5 to about 5. The reforming reaction is conducted in the presence of hydrogen which serves to repress the formation of carbonaceous deposits on the catalyst, the amount of hydrogen being from about 3 to about 20 moles of hydrogen per mole of hydrocarbon feed.

The feed to the catalytic reforming reactor can be straight-run naphtha, cracked naphtha and the like, or mixtures thereof. It is generally desired to subject the naphtha to a hydrotreatment to remove sulfur, nitrogen, arsenic and other compounds, and, in the case of cracked naphtha, to saturate olefins contained therein. While the feed may be a light, heavy or full-boiling range naphtha, it is preferred that the naphtha boil in the range from 160° to 400° F. The feed is preheated to reaction temperature, either alone or in admixture with recycle hydrogen gas, and passed to the reaction zone. Normally, two or more fixed bed reactors, preferably three or four, are used in series with reheat provided between reactors.

The reforming reaction involves many reactions such as the dehydrogenation of naphthenes to aromatics, isomerization of straight-chain paraffins to form branched-chain paraffins, isomerization of cyclic compounds, such as methylcyclopentane to cyclohexane, dehydrocyclization, dealkylation and hydrocracking.

During the course of the catalytic reforming reaction, catalyst activity gradually declines owing to a buildup of carbonaceous deposits on the catalyst and/or a depletion of halogen from the catalyst. Eventually it becomes necessary to regenerate the catalyst by subjecting the catalyst to an oxidizing atmosphere to remove carbonaceous deposits by burning. Halogen can be added to the catalyst during the regeneration procedure or by the addition of a volatile decomposable halogen compound to the feed during operation. Generally, however, carbon burn and/or halogen replenishment fails to restore the catalyst to initial activity and selectivity, or if so, only temporarily, and activity and selectivity decrease at an increased rate during subsequent use of the catalyst. This decreased activity, even with regenerated and halogenated catalyst, is attributed to agglomeration of platinum crystallites. Consequently, it has been the practice to process the "spent" platinum catalyst for the extraction, separation and recovery of the platinum which is then used for fresh catalyst. This is, of course, an expensive operation because of the platinum recovery charges and the cost of manufacturing the catalyst.

It has been proposed to reduce the size of the agglomerated platinum by subjecting the catalyst, after being burned substantially free of carbon, with an oxygen-containing gas under certain conditions of time, temperature and oxygen partial pressure. This procedure, generally referred to as an "air soak," is often only partially effective to favorably alter the size of the platinum crystallite.

This invention provides an improved method for restoring the activity and selectivity of "spent" platinum group metal catalyst in a fixed, moving or fluid bed catalytic reforming process. The method comprises the combined steps of regeneration and reactivation. Regeneration is the contacting of deactivated carbonized catalyst with an oxygen-containing gas in order to burn off carbonaceous deposits thereon, whereas reactivation includes chlorination of the catalyst and redispersal of platinum crystallites. Briefly, the proposed regeneration and reactivation procedure comprises removal of carbonaceous material from the "spent" catalyst by a controlled oxidation followed by exposing the substantially carbon-free catalyst to an atmosphere containing chlorine, water and oxygen. The halogen/oxygen treatment effects a redispersion of the platinum crystallites and restores metal activities of the catalysts while at the same time the chlorine content of the catalyst is affected by the treating gas. Since the level of halogen on the catalyst is quite critical, control of the chlorine deposition is very important. It is advantageous to deposit halogen on the catalyst in a two-step operation, as will be seen hereinafter.

The amount of chloride contained by a platinum reforming catalyst in equilibrium with a reconditioning gas is a function of the ratio of water to chlorine in the reconditioning gas and to a certain extent a function of temperature, and is independent of the partial pressure of these components and of the total reactor pressure. Thus, at a given temperature the equilibrium chloride content of the catalyst decreases as the $H_2O/Cl_2$ mole ratio is increased. For example, at 950° F., the equilibrium chloride content of platinum reforming catalyst is about 0.4% w. at a $H_2O/Cl_2$ ratio of 800/1 in the reconditioning gas and about 0.8% w. at a ratio of 25/1. On the other hand, at a constant $H_2O/Cl_2$ ratio, decreasing temperature increases the equilibrium chloride content of the catalyst. For example, decreasing temperature from 900° to 700° F. at constant $H_2O/Cl_2$ ratio increases the chloride content of the catalyst by about 0.08% w., basis catalyst. Therefore, to replenish chloride on a catalyst, a mixture of steam and chlorine, or a volatile decomposable chloride compound, is passed over the catalyst for a period of time, the $H_2O/Cl_2$ ratio being such as to give the desired chloride content at the temperature of the chloriding step, until equilibrium has been established.

Mere replacement of chloride on the catalyst by steam/chlorine treatment is ineffective to redisperse agglomerated platinum crystallites since platinum redispersal does not occur during chlorination in the absence of oxygen. While the chemistry involved in reactivating the catalyst is not well understood, it appears that the platinum redispersal step requires a chemical reaction between platinum, chlorine and oxygen. On the other hand, treatment of regenerated catalyst by exposure to a high partial pressure of oxygen at a relatively high temperature effects little, if any, redispersion of platinum. The extent of platinum redispersion during a high temperature oxygen treatment (air soak) is a function of the chloride content of the catalyst. Really satisfactory platinum redispersions do not occur unless the chloride content of the catalyst during the air soak period is at least about 0.5% w. and preferably greater. For example, at a chloride level of 0.5% w., platinum redispersion is about 85% of that of fresh catalyst. Below this value the degree of dispersion falls off rapidly. At a chloride content of 0.6% w., redispersion is substantially complete.

It is advantageous to conduct the air soak operation at the same time at which the catalyst is being chlorided, since platinum redispersion by air soak is enhanced when conducted under wet conditions rather than under dry conditions. Dry conditions are generally considered to be those wherein the partial pressure of water vapor is less than about 100 p.p.m. m. For example, with a catalyst having a chloride content of 0.6% w., platinum redispersal obtained by a high-temperature air soak with moist air (500 p.p.m. m.) is nearly 60% greater than that obtained by an air soak with dry air (50 p.p.m. m.). Air soak temperature is generally about 700° to 1050° F., preferably 850° to 950° F.

For a catalyst of high chloride content, i.e., those having a chloride content above 0.6% by weight, e.g., about 0.9% by weight, satisfactory platinum redispersal can generally be obtained by subjecting regenerated and rechlorided catalyst to a high-temperature air soak. With catalysts of low chloride content (<0.6% w.), a high-temperature air soak of the regenerated and rehalogenated catalyst is insufficient to give effective platinum redistribution. For example, a commercially available platinum reforming catalyst contains 0.75% by weight Pt, 0.35% by weight Cl and 0.35% by weight F on alumina. With such a catalyst, it is necessary to adjust the chloride content of the catalyst, following regeneration, to a level of 0.6% by weight or higher and then subject the chlorided catalyst to a high-temperature air soak, after which it is then necessary to strip chloride from the catalyst, e.g., by steam, until the chloride content has been reduced to the proper level.

The above method of obtaining platinum redispersal of a low chloride-containing catalyst has a disadvantage that chlorine requirements are relatively high. Moreover, considerable time is required to raise the equilibrium chloride content of the catalyst to above 0.6% w., and additional time is lost in stripping the excessive chloride content to the desired final low chloride level. In addition, risk of excessive corrosion in the downstream section of the plant where lower temperatures are encountered is considerably increased.

The above disadvantages are obviated by performing the chloride addition in a two-step operation. In the first step the stoichiometric amount of chloride required to increase the chloride content of the total catalyst inventory to the desired final level is introduced at the maximum allowable chloride injection rate at low water/chlorine mole ratio. The water/chlorine mole ratio should be sufficiently low to provide a chloride content of at least 0.6% w., and preferably higher, at the temperature which is employed. For example, at normal temperatures of 900° to 950° F., the water/chlorine mole ratio should be less than about 150/1. At lower temperatures, higher ratios can be used. The lower the ratio, of course, the higher will be the equilibrium content of chloride on the catalyst. This causes a high concentration of chloride, generally referred to as a blip or wave of high catalyst chloride content, to deposit on the upstream part of the catalyst inventory. Although the rate of chloride addition is relatively fast, there will not be a sharp line of demarcation between chlorided catalyst and spent catalyst at the front edge of the treating gas because as chloride is transferred from the treating gas to the catalyst the water/chlorine ratio in the treating gas increases as the gas passes through the bed and eventually reaches the level corresponding to that which is in equilibrium with the chloride content of the spent catalyst.

As soon as the total desired quantity of chloride has been added in the above way, the second, or smoothing, step is then commenced. This consists of increasing the water/chlorine mole ratio to that required to produce the desired chloride content on the catalyst at equilibrium. This is easily accomplished by reducing the chloride injection rate at constant water concentration in the reactor inlet gas. The "smoothing" gas serves to push the blip of high catalyst chloride content on through the bed. In its passage the blip supplies chloride to the chloride deficient catalyst downstream, which results in a continual reduction of blip amplitude as it traverses the bed. Thus, with the correct amount of chloride added during the blip injection step, the chloride content on the catalyst at the crest of the blip at the moment the blip is due to pass out of the last reactor outlet would be equal to the desired final chloride content on the catalyst. In this manner, most of the catalyst inventory is exposed to a chloride content sufficient to give a high degree of platinum dispersal on the catalyst.

If less than the required amount of chloride were added during the first step the chloride content of the catalyst at the outlet of the last reactor would not be as great as desired at the moment the blip were scheduled to pass that point. This would require continuation of the smoothing step for a longer period of time to bring the catalyst to the desired chloride content and would mean a greater proportion of the catalyst inventory would not be exposed to high chloride concentration required for a high degree of platinum dispersal. If more than the required amount of chloride were added during the first step, a substantial chloride blip would pass out of the last reactor, which would cause unnecessary corrosion in the cold end of the plant, would require continuation of the smoothing step to reduce the catalyst to the required chloride content, and would increase overall chloride consumption.

To reduce time required for chloriding the catalyst, the chlorine concentration in the treating gas should be at a maximum as limited by metallurgical or other reasons. Sufficient steam should then be introduced into the treating gas to give a low $H_2O/Cl_2$ ratio, the lower the ratio the higher the amplitude of the blip of catalyst chloride content. For example, for a catalyst inventory of 40,000 pounds, a chloride content of 0.15% w. on the spent catalyst, and a desired final chloride content of 0.35% w. on the catalyst, the amount of chloride required to bring the total catalyst inventory to the desired chloride level is 80 pounds. In adding this 80 pounds to the catalyst at 900° F. and a water/chlorine ratio of about 25, the equilibrium catalyst chloride content would be about 0.95% w. and only approximately the first 25% of the catalyst bed would be chlorided. At a lower water/chlorine mole ratio, e.g., about 10, the equilibrium catalyst chloride content would be about 1.05% w., and even less of the catalyst inventory would be chlorided to the higher level.

Chlorine, or any volatile, decomposable chloride compound, can be used in the chloriding step. It is preferred to use trichloroethylene as the source of chlorine since it is low in cost and is readily available. Moreover, decomposition of this material into chlorine and HCl readily occurs at the conditions to which it is subjected, and the proportion of chlorine formed with respect to the HCl formed is relatively high.

Reactivation of the catalyst is normally carried out at an elevated pressure. The time required for the air soak chloriding procedure will vary in inverse ratio with mass flow circulation rate. Thus, increasing system pressure allows circulation of appreciably more gas. In commercial units, pressure is generally limited by the installed recycle compressor facilities. In most cases, the air soak/chloriding pressure will be of the order of 75 to 100 p.s.i.g.

The air soak/chloriding or reactivation procedure is carried out after the catalyst has been regenerated by controlled burning to remove carbonaceous material. The removal of carbonaceous deposits by controlled burning is well known and may be effected in a conventional way. For example, oxygen diluted with nitrogen may be passed through a bed of the catalyst, the oxygen concentration in the mixture being controlled so that the temperature of the catalyst does not exceed about 1050° F., preferably about 850° F., while the carbonaceous deposits are being burned off. Of course, it is generally preferred to purge hydrocarbon material from the system before the controlled burning is initiated. Removal of hydrocarbon is accomplished by purging the system with nitrogen or inert gas, generally at about atmospheric pressure. Thus, when the system has been purged substantially free from hydrocarbon with inert gas, circulation of inert gas is established and combustion air is injected into the circulating stream to produce an oxygen concentration generally no greater than about 0.5% m. at the first reactor inlet. This produces a combustion front which progressively moves through the catalyst bed. After the combustion front has passed through the bed, the reactor temperature is slowly increased to 950° F., and, if no secondary combustion front occurs, oxygen concentration is then increased to about 2% m. Should secondary combustion be encountered, oxygen concentration should be reduced to original levels to avoid excessive temperatures which might damage the catalyst.

Although the air soak/chloriding procedure can be initiated at this time, it is generally advantageous to wait until the $CO_2$ concentration of the circulating gas has been reduced to a low volume, since at constant pressure this is generally the only way oxygen concentration can be increased by mechanical means. The removal of $CO_2$ from the system can be accomplished by a purge with air, preferably at a reduced pressure. Thus, when oxygen concentration has risen to about 15% m., system pressure is increased to the maximum at which the air can be injected and recycle gas circulation is established at a maximum rate, catalyst temperature being about 950° F. The high concentration of oxygen is advantageous also in inhibiting the reaction of chlorine with water.

With most commercial semi-regenerative platforming units, the maximum chlorine concentration in the treating gas will be limited to about 0.05% m. because of metallurgical reasons. Therefore, after the $CO_2$ purge the chloride compound, e.g. trichloroethylene, is injected into the circulating gas at a rate to produce an equivalent chloride concentration of 0.05% m. It is generally advisable to inject a considerable quantity of water, preferably with a corrosion inhibitor, into the inlet of the product condensers on the process side to reduce excessive corrosion in the cold end of the plant. Steam or water is then injected into the circulating gas stream of the reactor to produce the desired water/chlorine ratio at the reactor inlet. Satisfactory results are achieved by injecting sufficient water to produce 2.0% m. water at the reactor inlet which is equivalent to a water/chlorine ratio of 40/1. With high water concentrations in the treating gas, the time required to dry the system becomes greater. Also, excessive chloride loss from the catalyst during the drying step can result. When the total quantity of trichloroethylene has been injected which is sufficient to provide the desired chloride content for the total catalyst inventory, the second or smoothing step is initiated by reducing the trichloroethylene injection rate to that which will give the water/chlorine ratio necessary to provide the desired equilibrium chloride content on the catalyst. The change from the high to low trichloroethylene injection rate should be made without stopping the injection. The water injection is continued at the same rate to hold the 2% m. water concentration in the circulating gas at the inlet to the reactor. It is generally desirable to use a slightly lower water/chlorine ratio than is required to give the final desired chloride content of the catalyst since some of the chloride will be lost during subsequent stages of the overall regeneration procedure, such as the reduction and drying stage. Thus, if a final chloride content of 0.35% w. is desired, it is generally advantageous to use a water/chloride ratio during the smoothing step which will provide a chloride content of about 0.4–0.5% w. to compensate for the chloride which is subsequently lost in the drying operation. With many commercial reforming units, where the operation is normally conducted at 75 to 100 p.s.i.g. pressure, time required for the chloride blip stage will be about 1–3 hours and for the smoothing period about 12–20 hours.

Upon completion of the air soak/chloriding operation, water and trichloroethylene injection is discontinued. Completion of the air soak/chloriding operation can be determined by any suitable means, such as monitoring the exit gases and/or water from the product separator for chloride content. For example, when analysis of the exit gas from the smoothing operation is substantially the same as the entering gas, the catalyst bed is substantially at equilibrium. The system is then purged, while hot, with air to remove $CO_2$ and then, while still hot, with nitrogen to remove oxygen. Inert gas is generally not suitable for purge material at this stage since it often contains a considerable amount of carbon dioxide. The plant is partially dried with these hot purges. Further drying is effected after the introduction of hydrocarbon feed into the reaction zone.

After the catalyst has been regenerated as described, it is generally subjected to a reducing treatment by passing hydrogen over it while still hot. If impure hydrogen is used, such as from other catalytic reforming units, it is generally advisable to cool the catalyst bed to about 625 to 600° F. while circulating nitrogen during the purge step to avoid hydrocracking relatively heavy hydrocarbon gases contained in the catalytic reforming hydrogen gas. Reduction of oxidized platinum is easily effected and normally takes place while bringing the catalyst to conditions of temperature and pressure for the subsequent catalytic reforming operations. If desired, a decomposable sulfur compound can be injected into the circulating hydrogen stream to sulfide the catalyst in order to reduce excessive hydrocracking when hydrocarbon feed is introduced to initiate a new process period.

*Example I*

A commercial reforming catalyst was deactivated after extensive use in reforming a hydrotreated naphtha. Total catalyst life was about 192 barrels of feed per pound of catalyst. The catalyst had been regenerated several times during this period, catalyst life for the operating cycle since the last previous regeneration being about 22 barrels of feed per pound. Operating conditions during the last cycle ranged as follows:

| | |
|---|---|
| Liquid hourly space velocity | 1.4–1.7 |
| Reactor outlet pressure, p.s.i.g. | 325 |
| $H_2$/oil mole ratio | 14/1 to 20/1 |
| Weighted average bed temperature, ° F. | 890–925 |
| Reformate octane number, F–1–3 | 101 |

Composition of the fresh catalyst was 0.75% w. Pt, 0.30% w. Cl and 0.40% w. F on alumina.

The deactivated catalyst is regenerated and reactivated by the following procedure. After hydrocarbon feed is terminated, hydrogen circulation is maintained for two hours to remove residual hydrocarbons. Hydrogen is then removed from the system by a purge with flue gas. Catalyst temperature during the hydrogen and nitrogen purges is reduced to about 725° F., the flue gas circulation rate being about 25 million s.c.f.d. Sufficient air is injected into the flue gas to provide 0.5% v. oxygen at the reactor inlet. Carbon is burned from the catalyst with the dilute air, temperature of the catalyst not exceeding about 850° F. Time required for this low temperature carbon burnoff is about six hours. Temperature is then increased to 950° F. and oxygen concentration is increased from 0.5% v. to 2.0% v. to complete the carbon burnoff. This high temperature carbon burning is completed in about 14 hours. Upon completion of the high temperature carbon burn, air injection rate is increased to purge $CO_2$ from the system. The $CO_2$ purge requires approximately two hours.

After oxygen concentration of the recycle gas has reached 15% v., trichloroethylene and steam are injected into the circulating gas upstream of the reactor in an amount to provide 0.05% mol chlorine and 2% mol water. Flue gas circulation rate has been increased to approximately 40 million s.c.f.d. This "blip" injection period is continued until the total amount of chloride injected is equivalent to that required to bring the total catalyst inventory to about 0.5% w. chloride, basis catalyst. This injection is completed in 1.5 hours, after which the chloride injection rate is reduced by a factor of about 6 to provide a water chloride mole ratio of 250/1. This chloride "smoothing" phase is completed in about 11.5 hours. Temperature and pressure during the air soak/chloriding step is about 950° F. and 75 p.s.i.g., respectively.

Upon completion of the air soak/chloriding operation injection of water and trichloroethylene are discontinued and the system is purged with air and then nitrogen to remove $CO_2$ and oxygen. Hydrogen is then introduced into the system to purge the nitrogen and reduce the platinum prior to admitting hydrocarbon feed. Activity and selectivity of the regenerated and reactivated catalyst is substantially that of fresh catalyst. It is to be realized that the time required for the regeneration reactivation of the catalyst are for those of a typical commercial reforming unit and will vary somewhat depending upon, for example, the particular size of the unit involved, and the particular chloride levels desired.

Although the process of the invention has been described primarily with respect to platinum catalysts used in the catalytic reforming of naphthas, the invention is not limited to the conversion process in which the catalyst is used. The invention is applicable also to platinum catalysts which are widely known for such other conversion reactions as the isomerization of light hydrocarbons, e.g. pentanes and hexanes; hydrocracking of high boiling hydrocarbons, e.g. catalytically cracked gas oils; hydrotreating light distillates, e.g. furnace oils for reduction of pour point of the oil; and the like.

I claim as my invention:

1. A method for the regeneration and reactivation of a supported platinum catalyst deactivated by the accumulation of carbonaceous deposits thereon as well as by the agglomeration of the platinum into large crystallites of low activity which comprises removing at least a portion of the carbonaceous deposits by controlled burning at a temperature below about 1050° F., contacting the catalyst at a temperature in the range from about 700° to 1050° F. with a gaseous mixture containing oxygen, steam and chlorine, the molar ratio of steam to chlorine in said gas mixture being less than about 150 to 1 and such as to provide an equilibrium chloride content on the upstream portion of the catalyst of at least about 0.6% by weight, basis catalyst, continuing said contacting until the amount of chloride deposited on the upstream portion of the catalyst is substantially equivalent to the theoretical amount required to bring the total catalyst inventory to the desired level which is less than 0.6% by weight, increasing the steam to chlorine ratio in the gas mixture to a value above about 150 to 1 and which gives the desired equilibrium chloride content on the catalyst, and continuing the contacting at said increased steam to chlorine ratio until the total catalyst inventory is substantially at said desired equilibrium chloride content.

2. A method for the regeneration and reactivation of a supported platinum catalyst deactivated by the accumulation of carbonaceous deposits thereon as well as by the agglomeration of the platinum into large crystallites of low activity which comprises removing at least a portion of the carbonaceous deposits by controlled burning at a temperature below about 1050° F., contacting the catalyst at a temperature in the range from about 900° to 950° F. with a gaseous mixture containing oxygen, steam and chlorine, the molar ratio of steam to chlorine in said gas mixture being less than about 150 to 1 and such as to provide an equilibrium chloride content on the upstream portion of the catalyst of at least about 0.6% by weight, basis catalyst, continuing said contacting until the amount of chloride deposited on the upstream portion of the catalyst is substantially equivalent to the theoretical amount required to bring the total catalyst inventory to the desired level, which is less than 0.6% by weight, increasing the steam to chlorine ratio in the gas mixture to a value above 150 to 1 and which gives the desired equilibrium chloride content on the catalyst, and continuing the contacting at said increased steam to chlorine ratio until the total catalyst inventory is substantially at said desired equilibrium chloride content.

3. A method for the regeneration and reactivation of a supported platinum catalyst deactivated by the accumulation of carbonaceous deposits thereon as well as by the agglomeration of the platinum into large crystallites of low activity which comprises stripping the deactivated catalyst of hydrogen and hydrocarbon, by a purge with inert gas removing at least a portion of the carbonaceous deposits by controlled burning at a temperature below about 1050° F., contacting the catalyst at a temperature in the range from about 700° to 1050° F. with a gaseous mixture containing oxygen, steam and chlorine, the molar ratio of steam to chlorine in said gaseous mixture being such as to provide an equilibrium chloride content on the upstream portion of the catalyst of at least about 0.6% by weight, basis catalyst, continuing said contacting until the amount of chloride deposited on the upstream portion of the catalyst is substantially equivalent to the theoretical amount required to bring the total catalyst inventory to the desired level, which is less than 0.6% by weight, increasing the steam to chlorine ratio in the gas mixture to a value which gives the desired equilibrium chloride content on the catalyst, and continuing the contacting at said increased steam to chlorine ratio until the total catalyst inventory is substantially at said desired equilibrium chloride content.

4. A method for the regeneration and reactivation of a platinum on alumina reforming catalyst deactivated by the accumulation of carbonaceous deposits thereon as well as by the agglomeration of the platinum into large crystallites of low activity which comprises stripping the deactivated catalyst of hydrogen and hydrocarbon, by a purge with inert gas removing at least a portion of the carbonaceous deposits by controlled burning at a temperature of below about 850° F., contacting the catalyst at a temperature of about 900° to 950° F. with a gaseous mixture containing oxygen, steam and chlorine, the molar ratio of steam to chlorine in said gaseous mixture being less than about 150 to 1, to provide an equilibrium chloride content on the upstream portion of the catalyst of at least 0.6% by weight, basis catalyst, continuing said contacting until the amount of chloride deposited on the upstream portion of the catalyst is substantially equivalent to the theoretical amount required to bring the total catalyst inventory to a desired level which is less than 0.6% by weight, increasing the steam to chlorine ratio in the gas mixture to a value above 150 to 1 which gives the desired equilibrium chloride content on the catalyst, continuing the contacting at said increased steam to chlorine ratio until the total catalyst inventory is substantially at said desired equilibrium chloride content, discontinuing contacting with the gaseous mixture, purging the catalyst while hot with inert gas to remove oxygen and carbon oxides, and purging with hydrogen to remove nitrogen and reduce the platinum.

References Cited by the Examiner

UNITED STATES PATENTS

| | | | |
|---|---|---|---|
| 2,906,702 | 9/1959 | Brennan et al. | 252—416 |
| 2,981,694 | 4/1961 | Engel | 252—415 |
| 3,016,354 | 1/1962 | Hindin et al. | 252—416 |

OSCAR R. VERTIZ, *Primary Examiner.*

MAURICE A. BRINDISI, *Examiner.*

R. D. EDMONDS, R. M. DAVIDSON,
*Assistant Examiners.*